(12) United States Patent
Chan

(10) Patent No.: US 12,341,433 B2
(45) Date of Patent: Jun. 24, 2025

(54) POWER SUPPLY DEVICE WITH HIGH OUTPUT STABILITY

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 272 days.

(21) Appl. No.: 18/311,997

(22) Filed: May 4, 2023

(65) Prior Publication Data

US 2024/0283366 A1 Aug. 22, 2024

(30) Foreign Application Priority Data

Feb. 22, 2023 (TW) .................................. 112106407

(51) Int. Cl.
*H02M 1/42* (2007.01)
*H02M 1/00* (2006.01)
*H02M 3/335* (2006.01)

(52) U.S. Cl.
CPC ..... *H02M 3/33576* (2013.01); *H02M 1/0009* (2021.05); *H02M 1/0019* (2021.05); *H02M 1/4225* (2013.01); *H02M 1/4241* (2013.01)

(58) Field of Classification Search
CPC .......................... H02M 1/4225; H02M 1/4241
See application file for complete search history.

(56) References Cited

U.S. PATENT DOCUMENTS 10,554,122 B1 * 2/2020 Xiong ...................... H02M 1/44
2021/0367506 A1 * 11/2021 Yau ......................... H02M 1/007

* cited by examiner

*Primary Examiner* — Gary A Nash
(74) *Attorney, Agent, or Firm* — McClure, Qualey & Rodack, LLP

(57) ABSTRACT

A power supply device with high output stability includes a bridge rectifier, a first capacitor, a boost inductor, a first voltage divider circuit, a power switch element, a first output stage circuit, a second voltage divider circuit, a switch circuit, a transformer, a resonant capacitor, a second output stage circuit, and a detection and control circuit. The detection and control circuit can appropriately control the switch circuit according to a first divided voltage from the first voltage divider circuit, a second divided voltage from the second voltage divider circuit, and an output voltage from the second output stage circuit.

15 Claims, 3 Drawing Sheets

POWER SUPPLY DEVICE WITH HIGH OUTPUT STABILITY

CROSS REFERENCE TO RELATED APPLICATIONS

This application claims priority of Taiwan Patent Application No. 112106407 filed on Feb. 22, 2023, the entirety of which is incorporated by reference herein.

BACKGROUND OF THE INVENTION

Field of the Invention

The disclosure generally relates to a power supply device, and more specifically, to a power supply device with high output stability.

Description of the Related Art

Power supply devices are indispensable elements in the field of notebook computers. However, if a power supply device has insufficient output stability, it will tend to degrade the overall operational performance of the relative notebook computer. Accordingly, there is a need to propose a novel solution for solving this problem of the prior art.

BRIEF SUMMARY OF THE INVENTION

In an exemplary embodiment, the invention is directed to a power supply device with high output stability. The power supply device includes a bridge rectifier, a first capacitor, a boost inductor, a first voltage divider circuit, a power switch element, a first output stage circuit, a second voltage divider circuit, a switch circuit, a transformer, a resonant capacitor, a second output stage circuit, and a detection and control circuit. The bridge rectifier generates a rectified voltage according to the first input voltage and the second input voltage. The first capacitor stores the rectified voltage. The first voltage divider circuit generates a first divided voltage according to the rectified voltage. The boost inductor receives the rectified voltage. The power switch element selectively couples the boost inductor to the ground voltage according to the first driving voltage. The first output stage circuit is coupled to the boost inductor, and is configured to generate a median voltage. The second voltage divider circuit generates a second divided voltage according to the median voltage. The switch circuit generates a switching voltage according to the median voltage, the second driving voltage, and the third driving voltage. The transformer includes a main coil, a first secondary coil, and a second secondary coil. A leakage inductor and a magnetizing inductor are built into the transformer. The main coil receives the switching voltage through the leakage inductor. The resonant capacitor is coupled to the magnetizing inductor. The second output stage circuit is coupled to the first secondary coil and the second secondary coil, and is configured to an output voltage. The detection and control circuit generates the first driving voltage, the second driving voltage, and the third driving voltage according to the first divided voltage, the second divided voltage, and the output voltage.

In some embodiments, the bridge rectifier includes a first diode, a second diode, a third diode, and a fourth diode. The first diode has an anode coupled to a first input node for receiving the first input voltage, and a cathode coupled to a first node for outputting the rectified voltage. The second diode has an anode coupled to a second input node for receiving the second input voltage, and a cathode coupled to the first node. The third diode has an anode coupled to the ground voltage, and a cathode coupled to the first input node. The fourth diode has an anode coupled to the ground voltage, and a cathode coupled to the second input node. The first capacitor has a first terminal coupled to the first node for receiving the rectified voltage, and a second terminal coupled to the ground voltage. The boost inductor has a first terminal coupled to the first node for receiving the rectified voltage, and a second terminal coupled to a second node.

In some embodiments, the first voltage divider circuit includes a first resistor and a second resistor. The first resistor has a first terminal coupled to the first node for receiving the rectified voltage, and a second terminal coupled to a first control node for outputting the first divided voltage. The second resistor has a first terminal coupled to the first control node, and a second terminal coupled to the ground voltage.

In some embodiments, the power switch element includes a first transistor. The first transistor has a control terminal for receiving the first driving voltage, a first terminal coupled to the ground voltage, and a second terminal coupled to the second node.

In some embodiments, the first output stage circuit includes a fifth diode and a second capacitor. The fifth diode has an anode coupled to the second node, and a cathode coupled to a third node for outputting the median voltage. The second capacitor has a first terminal coupled to the third node, and a second terminal coupled to the ground voltage.

In some embodiments, the second voltage divider circuit includes a third resistor and a fourth resistor. The third resistor has a first terminal coupled to the third node for receiving the median voltage, and a second terminal coupled to a second control node for outputting the second divided voltage. The fourth resistor has a first terminal coupled to the second control node, and a second terminal coupled to the ground voltage.

In some embodiments, the switch circuit includes a second transistor and a third transistor. The second transistor has a control terminal for receiving the second driving voltage, a first terminal coupled to a fourth node for outputting the switching voltage, and a second terminal coupled to the third node for receiving the median voltage. The third transistor has a control terminal for receiving the third driving voltage, a first terminal coupled to the ground voltage, and a second terminal coupled to the fourth node.

In some embodiments, the leakage inductor has a first terminal coupled to the fourth node for receiving the switching voltage, and a second terminal coupled to a fifth node. The main coil has a first terminal coupled to the fifth node, and a second terminal coupled to a sixth node. The magnetizing inductor has a first terminal coupled to the fifth node, and a second terminal coupled to the sixth node. The resonant capacitor has a first terminal coupled to the sixth node, and a second terminal coupled to the ground voltage. The first secondary coil has a first terminal coupled to a seventh node, and a second terminal coupled to a common node. The second secondary coil has a first terminal coupled to the common node, and a second terminal coupled to an eighth node.

In some embodiments, the second output stage circuit includes a sixth diode, a seventh diode, and a third capacitor. The sixth diode has an anode coupled to the seventh node, and a cathode coupled to an output node for outputting the output voltage. The seventh diode has an anode coupled to the eighth node, and a cathode coupled to the output node.

The third capacitor has a first terminal coupled to the output node, and a second terminal coupled to the common node.

In some embodiments, the detection and control circuit includes a PWM (Pulse Width Modulation) IC (Integrated Circuit), a first comparator, a second comparator, a first AND gate, a frequency error circuit, a second AND gate, and an MCU (Microcontroller Unit). The PWM IC generates the first driving voltage. The first comparator has a positive input terminal for receiving a reference voltage, a negative input terminal for receiving the first divided voltage, and an output terminal for outputting the first comparison voltage. The second comparator has a positive input terminal for receiving the reference voltage, a negative input terminal for receiving the second divided voltage, and an output terminal for outputting a second comparison voltage. The first AND gate has a first input terminal for receiving the first comparison voltage, a second input terminal for receiving the second comparison voltage, and an output terminal for outputting a first logic voltage. The frequency error circuit compares the switching frequency of the second driving voltage with a reference frequency, so as to generate a third comparison voltage. The second AND gate has a first input terminal for receiving the third comparison voltage, a second input terminal for receiving the output voltage, and an output terminal for outputting a second logic voltage. The MCU provides the reference voltage and the reference frequency, and is configured to generate the second driving voltage and the third driving voltage according to the first logic voltage and the second logic voltage. If both the first logic voltage and the second logic voltage have high logic levels, the MCU will stop outputting the second driving voltage and the third driving voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
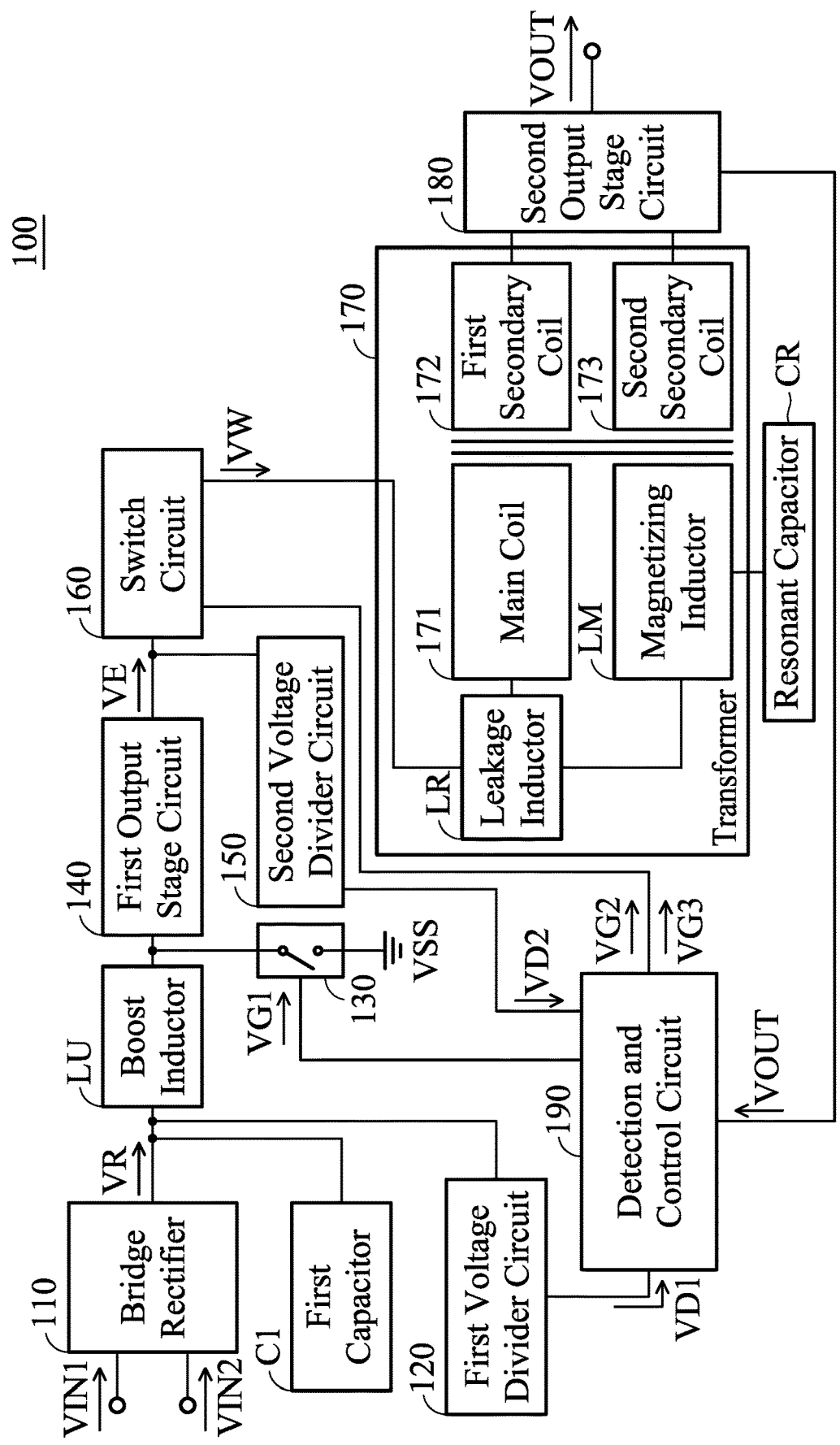
FIG. 1 is a diagram of a power supply device according to an embodiment of the invention.

FIG. 1 is a diagram of a power supply device 100 according to an embodiment of the invention. For example, the power supply device 100 may be applied to a desktop computer, a notebook computer, or an all-in-one computer. As shown in FIG. 1, the power supply device 100 includes a bridge rectifier 110, a first capacitor C1, a boost inductor LU, a first voltage divider circuit 120, a power switch element 130, a first output stage circuit 140, a second voltage divider circuit 150, a switch circuit 160, a transformer 170, a resonant capacitor CR, a second output stage circuit 180, and a detection and control circuit 190. It should be noted that the power supply device 100 may further include other components, such as a voltage regulator and/or a negative feedback circuit, although they are not displayed in FIG. 1.

The bridge rectifier 110 generates a rectified voltage VR according to a first input voltage VIN1 and a second input voltage VIN2. An AC (Alternating Current) voltage difference with any frequency and any magnitude may be formed between the first input voltage VIN1 and the second input voltage VIN2. For example, the frequency of the AC voltage difference may be about 50 Hz or 60 Hz, and the RMS (Root-Mean-Square) value of the AC voltage difference may be from about 90V to 264V, but they are not limited thereto. The first capacitor C1 is configured to store the rectified voltage VR. The first voltage divider circuit 120 generates a first divided voltage VD1 according to the rectified voltage VR. The boost inductor LU receives the rectified voltage VR. The power switch element 130 selectively couples the boost inductor LU to a ground voltage VSS (e.g., 0V) according to a first driving voltage VG1. For example, if the first driving voltage VG1 has a high logic level (i.e., a logic "1"), the power switch element 130 may couple the boost inductor LU to the ground voltage VSS (i.e., the power switch element 130 is similar to a short-circuited path). Conversely, if the first driving voltage VG1 has a low logic level (i.e., a logic "1"), the power switch element 130 may not couple the boost inductor LU to the ground voltage VSS (i.e., the power switch element 130 is similar to an open-circuited path). The first output stage circuit 140 is coupled to the boost inductor LU, and is configured to generate a median voltage VE. The second voltage divider circuit 150 generates a second divided voltage VD2 according to the median voltage VE. The switch circuit 160 generates a switching voltage VW according to the median voltage VE, a second driving voltage VG2, and a third driving voltage VG3. The transformer 170 includes a main coil 171, a first secondary coil 172, and a second secondary coil 173. A leakage inductor LR and a magnetizing inductor LM are built in the transformer 170. The leakage inductor LR, the magnetizing inductor LM, and the main coil 171 may be positioned at the same side of the transformer 170. The first secondary coil 172 and the second secondary coil 173 may be positioned at the opposite side of the transformer 170. The main coil 171 receives the switching voltage VW through the leakage inductor LR. The first secondary coil 172 and the second secondary coil 173 can be operated according to the switching voltage VW. The resonant capacitor CR is coupled to the magnetizing inductor LM. The second output stage circuit 180 is coupled to the first secondary coil 172 and the second secondary coil 173, and is configured to generate an output voltage VOUT. For example, the output voltage VOUT may be a DC (Direct Current) voltage, whose voltage level may be from 18V to 22V, but it is not limited thereto. The detection and control circuit 190 generates the first driving voltage VG1, the second driving voltage VG2, and the third driving voltage VG3 according to the first divided voltage VD1, the second divided voltage VD2, and the output voltage VOUT. With such a design, the output stability of the power supply device 100 can be significantly enhanced based on practical measurements since the operation of the switch circuit 160 is appropriately controlled by the detection and control circuit 190 according to the I/O (Input/Output) conditions of the power supply device 100.

The following embodiments will introduce the detailed structure and operation of the power supply device 100. It should be understood these figures and descriptions are merely exemplary, rather than limitations of the invention.

Figure 2:
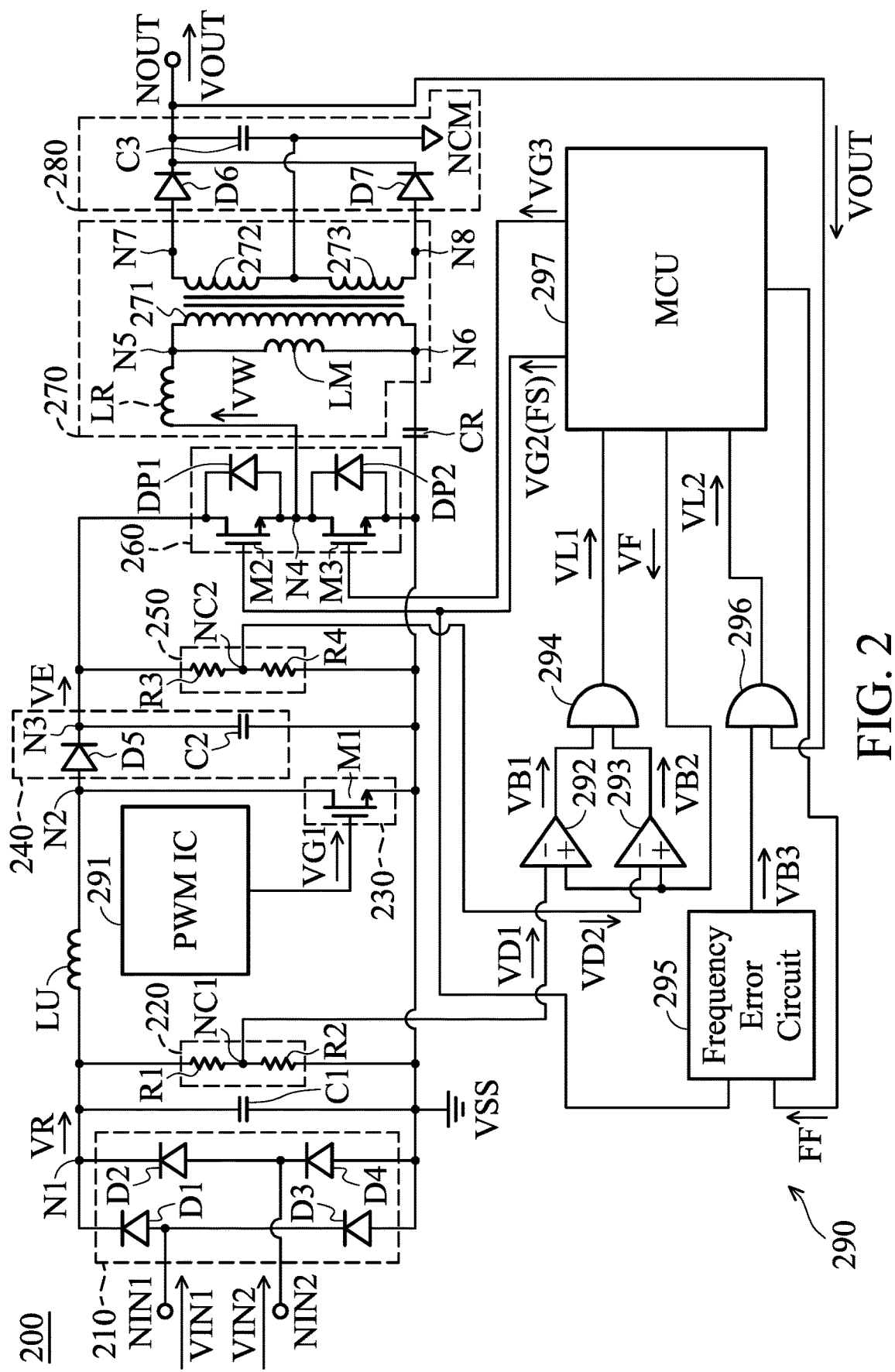
FIG. 2 is a diagram of circuitry of a power supply device according to an embodiment of the invention.

FIG. 2 is a diagram of circuitry of a power supply device 200 according to an embodiment of the invention. In the embodiment of FIG. 2, the power supply device 200 with a first input node NIN1, a second input node NIN2 and an output node NOUT includes a bridge rectifier 210, a first capacitor C1, a boost inductor LU, a first voltage divider circuit 220, a power switch element 230, a first output stage circuit 240, a second voltage divider circuit 250, a switch circuit 260, a transformer 270, a resonant capacitor CR, a second output stage circuit 280, and a detection and control circuit 290. The first input node NIN1 and the second input node NIN2 of the power supply device 200 are arranged for receiving a first input voltage VIN1 and a second input voltage VIN2 from an external input power source (not shown), respectively. The output node NOUT of the power supply device 200 is arranged for outputting an output voltage VOUT to an external device, such as a notebook computer (not shown).

The bridge rectifier 210 includes a first diode D1, a second diode D2, a third diode D3, and a fourth diode D4. The first diode D1 has an anode coupled to the first input node NIN1, and a cathode coupled to a first node N1 for outputting a rectified voltage VR. The second diode D2 has an anode coupled to the second input node NIN2, and a cathode coupled to the first node N1. The third diode D3 has an anode coupled to a ground voltage VSS, and a cathode coupled to the first input node NIN1. The fourth diode D4 has an anode coupled to the ground voltage VSS, and a cathode coupled to the second input node NIN2.

The first capacitor C1 has a first terminal coupled to the first node N1 for receiving the rectified voltage VR, and a second terminal coupled to the ground voltage VSS.

The first voltage divider circuit 220 includes a first resistor R1 and a second resistor R2. The first resistor R1 has a first terminal coupled to the first node N1 for receiving the rectified voltage VR, and a second terminal coupled to a first control node NC1 for outputting a first divided voltage VD1. The second resistor R2 has a first terminal coupled to the first control node NC1, and a second terminal coupled to the ground voltage VSS. In some embodiments, the resistance of the first resistor R1 is at least 20 times that of the second resistor R2, but it is not limited thereto.

The boost inductor LU has a first terminal coupled to the first node N1 for receiving the rectified voltage VR, and a second terminal coupled to a second node N2.

The power switch element 230 includes a first transistor M1. For example, the first transistor M1 may be an NMOS-FET (N-type Metal Oxide Semiconductor Field Effect Transistor). The first transistor M1 has a control terminal (e.g., a gate) for receiving a first driving voltage VG1, a first terminal (e.g., a source) coupled to the ground voltage VSS, and a second terminal (e.g., a drain) coupled to the second node N2.

The first output stage circuit 240 includes a fifth diode D5 and a second capacitor C2. The fifth diode D5 has an anode coupled to the second node N2, and a cathode coupled to a third node N3 for outputting a median voltage VE. The second capacitor C2 has a first terminal coupled to the third node N3, and a second terminal coupled to the ground voltage VSS.

The second voltage divider circuit 250 includes a third resistor R3 and a fourth resistor R4. The third resistor R3 has a first terminal coupled to the third node N3 for receiving the median voltage VE, and a second terminal coupled to a second control node NC2 for outputting a second divided voltage VD2. The fourth resistor R4 has a first terminal coupled to the second control node NC2, and a second terminal coupled to the ground voltage VSS. In some embodiments, the resistance of the third resistor R3 is at least 20 times that of the fourth resistor R4, but it is not limited thereto.

The switch circuit 260 includes a second transistor M2 and a third transistor M3. For example, each of the second transistor M2 and the third transistor M3 may be an NMOS-FET. The second transistor M2 has a control terminal (e.g., a gate) for receiving a second driving voltage VG2, a first terminal (e.g., a source) coupled to a fourth node N4 for outputting a switching voltage VW, and a second terminal (e.g., a drain) coupled to the third node N3 for receiving the median voltage VE. In some embodiments, a first parasitic diode DP1 is built in the second transistor M2. The first parasitic diode DP1 has an anode coupled to the fourth node N4, and a cathode coupled to the third node N3. The third transistor M3 has a control terminal (e.g., a gate) for receiving a third driving voltage VG3, a first terminal (e.g., a source) coupled to the ground voltage VSS, and a second terminal (e.g., a drain) coupled to the fourth node N4. In some embodiments, a second parasitic diode DP2 is built in the third transistor M3. The second parasitic diode DP2 has an anode coupled to the ground voltage VSS, and a cathode coupled to the fourth node N4.

The transformer 270 includes a main coil 271, a first secondary coil 272, and a second secondary coil 273. A leakage inductor LR and a magnetizing inductor LM are built in the transformer 270. The leakage inductor LR and the magnetizing inductor LM are inherent elements, which are generated when the transformer 270 is manufactured, and they are not external independent elements. The leakage inductor LR, the main coil 271, and the magnetizing inductor LM may be positioned at the same side (e.g., the primary side) of the transformer 270. The first secondary coil 272 and the second secondary coil 273 may be positioned at the opposite side (e.g., the secondary side isolated from the primary side) of the transformer 270. The leakage inductor LR has a first terminal coupled to the fourth node N4 for receiving the switching voltage VW, and a second terminal coupled to a fifth node N5. The main coil 271 has a first terminal coupled to the fifth node N5, and a second terminal coupled to a sixth node N6. The magnetizing inductor LM has a first terminal coupled to the fifth node N5, and a second terminal coupled to the sixth node N6. The resonant capacitor CR has a first terminal coupled to the sixth node N6, and a second terminal coupled to the ground voltage VSS. In some embodiments, a resonant tank of the power supply device 200 is formed by the leakage inductor LR, the magnetizing inductor LM, and the resonant capacitor CR. The first secondary coil 272 has a first terminal coupled to a seventh node N7, and a second terminal coupled to a common node NCM. For example, the common node NCM may be considered as another ground voltage, which may be the same as or different from the aforementioned ground voltage VSS. The second secondary coil 273 has a first terminal coupled to the common node NCM, and a second terminal coupled to an eighth node N8.

The second output stage circuit 280 includes a sixth diode D6, a seventh diode D7, and a third capacitor C3. The sixth diode D6 has an anode coupled to the seventh node N7, and a cathode coupled to the output node NOUT. The seventh diode D7 has an anode coupled to the eighth node N8, and a cathode coupled to the output node NOUT. The third capacitor C3 has a first terminal coupled to the output node NOUT, and a second terminal coupled to the common node NCM.

The detection and control circuit 290 includes a PWM (Pulse Width Modulation) IC (Integrated Circuit) 291, a first comparator 292, a second comparator 293, a first AND gate 294, a frequency error circuit 295, a second AND gate 296, and an MCU (Microcontroller Unit) 297.

The PWM IC 291 generates the first driving voltage VG1. For example, the first driving voltage VG1 may be maintained at a constant voltage level when the power supply device 200 is initialized. The first driving voltage VG1 may provide a periodic clock waveform after the power supply device 200 is normally operated.

The first comparator 292 has a positive input terminal for receiving a reference voltage VF, a negative input terminal for receiving the first divided voltage VD1, and an output terminal for outputting a first comparison voltage VB1. For example, if the first divided voltage VD1 is lower than or equal to the reference voltage VF, the first comparator 292 may output the first comparison voltage VB1 with a high logic level. Conversely, if the first divided voltage VD1 is higher than the reference voltage VF, the first comparator 292 may output the first comparison voltage VB1 with a low logic level.

The second comparator 293 has a positive input terminal for receiving the reference voltage VF, a negative input terminal for receiving the second divided voltage VD2, and an output terminal for outputting a second comparison voltage VB2. For example, if the second divided voltage VD2 is lower than or equal to the reference voltage VF, the second comparator 293 may output the second comparison voltage VB2 with a high logic level. Conversely, if the second divided voltage VD2 is higher than the reference voltage VF, the second comparator 293 may output the second comparison voltage VB2 with a low logic level.

The first AND gate 294 has a first input terminal for receiving the first comparison voltage VB1, a second input terminal for receiving the second comparison voltage VB2, and an output terminal for outputting a first logic voltage VL1. For example, if both of the first comparison voltage VB1 and the second comparison voltage VB2 have high logic levels, the first AND gate 294 may output the first logic level VL1 with a high logic level. Conversely, if any of the first comparison voltage VB1 and the second comparison voltage VB2 has a low logic level, the first AND gate 294 may output the first logic level VL1 with a low logic level.

The frequency error circuit 295 compares the switching frequency FS of the second driving voltage VG2 with a reference frequency FF, so as to generate a third comparison voltage VB3. For example, if the switching frequency FS is exactly equal to the reference frequency FF, the frequency error circuit 295 may output the third comparison voltage VB3 with a high logic level. Conversely, if the switching frequency FS is different from the reference frequency FF, the frequency error circuit 295 may output the third comparison voltage VB3 with a low logic level.

The second AND gate 296 has a first input terminal for receiving the third comparison voltage VB3, a second input terminal for receiving the output voltage VOUT, and an output terminal for outputting a second logic voltage VL2. For example, if both of the third comparison voltage VB3 and the output voltage VOUT have high logic levels, the second AND gate 296 may output the second logic level VL2 with a high logic level. Conversely, if any of the third comparison voltage VB3 and the output voltage VOUT has a low logic level, the second AND gate 296 may output the second logic level VL2 with a low logic level.

The MCU 297 provides the reference voltage VF and the reference frequency FF as mentioned above. The reference voltage VF may be a constant voltage, such as about 10V. The reference voltage FF may be a constant frequency, such as about 115 kHz. The MCU 297 also generates the second driving voltage VG2 and the third driving voltage VG3 according to the first logic voltage VL1 and the second logic voltage VL2. For example, the second driving voltage VG2 and the third driving voltage VG3 may have the same switching frequency FS, but the second driving voltage VG2 and the third driving voltage VG3 may have complementary logic levels. In some embodiments, if any of the first logic voltage VL1 and the second logic voltage VL2 has a low logic level, the MCU 297 will normally output the second driving voltage VG2 and the third driving voltage VG3. In alternative embodiments, if both of the first logic voltage VL1 and the second logic voltage VL2 have high logic levels, the MCU 297 will stop outputting the second driving voltage VG2 and the third driving voltage VG3, or will keep each of the second driving voltage VG2 and the third driving voltage VG3 at a low logic level.

Figure 3:
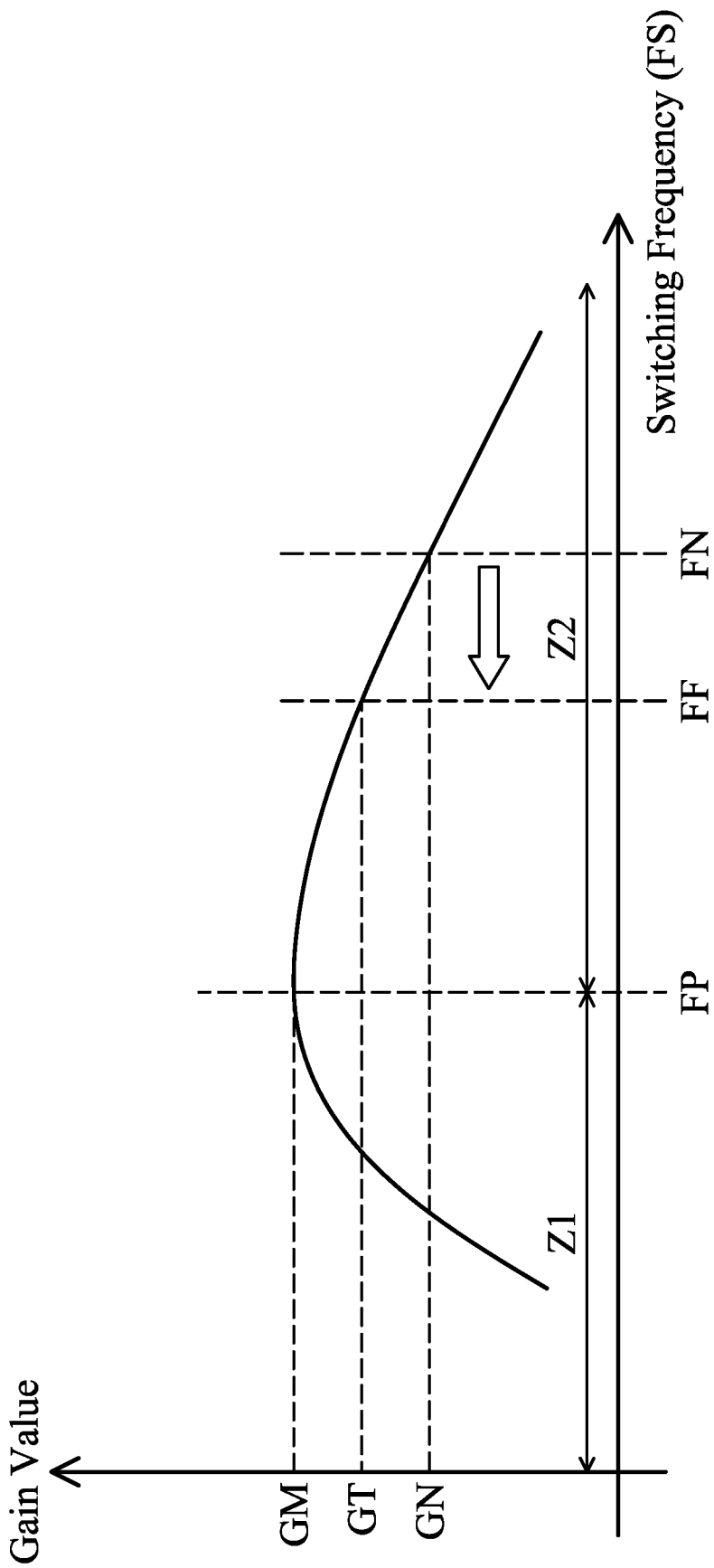
FIG. 3 is a diagram of operational characteristics of a power supply device according to an embodiment of the invention.

FIG. 3 is a diagram of operational characteristics of the power supply device 200 according to an embodiment of the invention. The horizontal axis represents the switching frequency FS of the second driving voltage VG2, and the vertical axis represents the corresponding gain value of the aforementioned resonant tank. According to the measurement of FIG. 3, when the switching frequency FS of the second driving voltage VG2 is exactly equal to a peak frequency FP, the aforementioned resonant tank will provide a maximum gain value GM. In addition, if the switching frequency FS of the second driving voltage VG2 is lower than the peak frequency FP, it will be considered that the aforementioned resonant tank is operated within a capacitive region Z1. Conversely, if the switching frequency FS of the second driving voltage VG2 is higher than the peak frequency FP, it will be considered that the aforementioned resonant tank is operated within an inductive region Z2. It should be understood that the capacitive region Z1 is required to be avoided. The capacitive region Z1 may accidentally destroy the second transistor M2 and the third transistor M3 because of non-ideal reverse currents of the first parasitic diode DP1 and the second parasitic diode DP2.

In some embodiments, the operational principles of the power supply device 200 will be described as follows. Please refer to FIG. 2 and FIG. 3 together. If the external input power source normally provide the first input voltage VIN1 and the second input voltage VIN2, the MCU 297 can continuously output the second driving voltage VG2 and the third driving voltage VG3 for driving the second transistor M2 and the third transistor M3. At this time, the switching frequency FS of the second driving voltage VG2 may be a normal frequency FN, and the aforementioned resonant tank may provide a normal gain value GN.

Conversely, if the external input power source is removed, the first input voltage VIN1 and the second input voltage VIN2 may disappear, and the first divided voltage VD1 and the second divided voltage VD2 may gradually become lower. Next, the first AND gate 294 can output the first logic level VL1 with a high logic level. On the other hand, in order to maintain the output voltage VOUT, the switching frequency FS of the second driving voltage VG2 may correspondingly become lower. When the switching frequency FS of the second driving voltage VG2 is reduced from the normal frequency FN to the reference frequency FF, the aforementioned resonant tank can provide a threshold gain value GT, and the second AND gate 296 can output the second logic voltage VL2 with a high logic level. At this time, the MCU 297 can stop outputting the second driving voltage VG2 and the third driving voltage VG3, or can keep each of the second driving voltage VG2 and the third driving voltage VG3 at a low logic level, so as to prevent the second transistor M2 and the third transistor M3 being accidentally destroyed. It should be noted that since the reference frequency FF is higher than the peak frequency FP, the power supply device 200 cannot enter the capacitive region Z1, and the power supply device 200 can be merely operated within the inductive region Z2. Therefore, the output stability and the overall reliability of the power supply device 200 can be effectively improved.

The invention proposes a novel power supply device. According to practical measurements, the power supply device using the aforementioned design can significantly improve the output stability, and therefore it is suitable for application in a variety of devices.

Note that the above voltages, currents, resistances, inductances, capacitances and other element parameters are not limitations of the invention. A designer can adjust these settings according to different requirements. The power supply device of the invention is not limited to the configurations of FIGS. 1-3. The invention may merely include any one or more features of any one or more embodiments of FIGS. 1-3. In other words, not all of the features displayed in the figures should be implemented in the power supply device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A power supply device with high output stability, comprising:
    a bridge rectifier, generating a rectified voltage according to a first input voltage and a second input voltage;
    a first capacitor, storing the rectified voltage;
    a first voltage divider circuit, generating a first divided voltage according to the rectified voltage;
    a boost inductor, receiving the rectified voltage;
    a power switch element, selectively coupling the boost inductor to a ground voltage according to a first driving voltage;
    a first output stage circuit, coupled to the boost inductor, and generating a median voltage;
    a second voltage divider circuit, generating a second divided voltage according to the median voltage;
    a switch circuit, generating a switching voltage according to the median voltage, a second driving voltage, and a third driving voltage;
    a transformer, comprising a main coil, a first secondary coil, and a second secondary coil, wherein a leakage inductor and a magnetizing inductor are built in the transformer, and the main coil receives the switching voltage through the leakage inductor;
    a resonant capacitor, coupled to the magnetizing inductor;
    a second output stage circuit, coupled to the first secondary coil and the second secondary coil, and generating an output voltage; and
    a detection and control circuit, generating the first driving voltage, the second driving voltage, and the third driving voltage according to the first divided voltage, the second divided voltage, and the output voltage.

2. The power supply device as claimed in claim 1, wherein the bridge rectifier comprises:
    a first diode, wherein the first diode has an anode coupled to a first input node for receiving the first input voltage, and a cathode coupled to a first node for outputting the rectified voltage;
    a second diode, wherein the second diode has an anode coupled to a second input node for receiving the second input voltage, and a cathode coupled to the first node;
    a third diode, wherein the third diode has an anode coupled to the ground voltage, and a cathode coupled to the first input node; and
    a fourth diode, wherein the fourth diode has an anode coupled to the ground voltage, and a cathode coupled to the second input node;
    wherein the first capacitor has a first terminal coupled to the first node for receiving the rectified voltage, and a second terminal coupled to the ground voltage;
    wherein the boost inductor has a first terminal coupled to the first node for receiving the rectified voltage, and a second terminal coupled to a second node.

3. The power supply device as claimed in claim 2, wherein the first voltage divider circuit comprises:
    a first resistor, wherein the first resistor has a first terminal coupled to the first node for receiving the rectified voltage, and a second terminal coupled to a first control node for outputting the first divided voltage; and
    a second resistor, wherein the second resistor has a first terminal coupled to the first control node, and a second terminal coupled to the ground voltage.

4. The power supply device as claimed in claim 2, wherein the power switch element comprises:
    a first transistor, wherein the first transistor has a control terminal for receiving the first driving voltage, a first terminal coupled to the ground voltage, and a second terminal coupled to the second node.

5. The power supply device as claimed in claim 2, wherein the first output stage circuit comprises:
    a fifth diode, wherein the fifth diode has an anode coupled to the second node, and a cathode coupled to a third node for outputting the median voltage; and a second capacitor, wherein the second capacitor has a first terminal coupled to the third node, and a second terminal coupled to the ground voltage.

6. The power supply device as claimed in claim 5, wherein the second voltage divider circuit comprises:
a third resistor, wherein the third resistor has a first terminal coupled to the third node for receiving the median voltage, and a second terminal coupled to a second control node for outputting the second divided voltage; and
a fourth resistor, wherein the fourth resistor has a first terminal coupled to the second control node, and a second terminal coupled to the ground voltage.

7. The power supply device as claimed in claim 5, wherein the switch circuit comprises:
a second transistor, wherein the second transistor has a control terminal for receiving the second driving voltage, a first terminal coupled to a fourth node for outputting the switching voltage, and a second terminal coupled to the third node for receiving the median voltage; and
a third transistor, wherein the third transistor has a control terminal for receiving the third driving voltage, a first terminal coupled to the ground voltage, and a second terminal coupled to the fourth node.

8. The power supply device as claimed in claim 7, wherein the leakage inductor has a first terminal coupled to the fourth node for receiving the switching voltage, and a second terminal coupled to a fifth node, wherein the main coil has a first terminal coupled to the fifth node, and a second terminal coupled to a sixth node, wherein the magnetizing inductor has a first terminal coupled to the fifth node, and a second terminal coupled to the sixth node, wherein the resonant capacitor has a first terminal coupled to the sixth node, and a second terminal coupled to the ground voltage, wherein the first secondary coil has a first terminal coupled to a seventh node, and a second terminal coupled to a common node, and wherein the second secondary coil has a first terminal coupled to the common node, and a second terminal coupled to an eighth node.

9. The power supply device as claimed in claim 8, wherein the second output stage circuit comprises:
a sixth diode, wherein the sixth diode has an anode coupled to the seventh node, and a cathode coupled to an output node for outputting the output voltage;
a seventh diode, wherein the seventh diode has an anode coupled to the eighth node, and a cathode coupled to the output node; and
a third capacitor, wherein the third capacitor has a first terminal coupled to the output node, and a second terminal coupled to the common node.

10. The power supply device as claimed in claim 1, wherein the detection and control circuit comprises:
a PWM (Pulse Width Modulation) IC (Integrated Circuit), generating the first driving voltage; and
a first comparator, wherein the first comparator has a positive input terminal for receiving a reference voltage, a negative input terminal for receiving the first divided voltage, and an output terminal for outputting a first comparison voltage.

11. The power supply device as claimed in claim 10, wherein the detection and control circuit further comprises:
a second comparator, wherein the second comparator has a positive input terminal for receiving the reference voltage, a negative input terminal for receiving the second divided voltage, and an output terminal for outputting a second comparison voltage.

12. The power supply device as claimed in claim 11, wherein the detection and control circuit further comprises:
a first AND gate, wherein the first AND gate has a first input terminal for receiving the first comparison voltage, a second input terminal for receiving the second comparison voltage, and an output terminal for outputting a first logic voltage.

13. The power supply device as claimed in claim 12, wherein the detection and control circuit further comprises:
a frequency error circuit, comparing a switching frequency of the second driving voltage with a reference frequency, so as to generate a third comparison voltage.

14. The power supply device as claimed in claim 13, wherein the detection and control circuit further comprises:
a second AND gate, wherein the second AND gate has a first input terminal for receiving the third comparison voltage, a second input terminal for receiving the output voltage, and an output terminal for outputting a second logic voltage.

15. The power supply device as claimed in claim 14, wherein the detection and control circuit further comprises:
an MCU (Microcontroller Unit), providing the reference voltage and the reference frequency, and generating the second driving voltage and the third driving voltage according to the first logic voltage and the second logic voltage;
wherein if both of the first logic voltage and the second logic voltage have high logic levels, the MCU stops outputting the second driving voltage and the third driving voltage.

* * * * *